INVENTOR
DUFFER B. CRAWFORD
BY
ATTORNEY

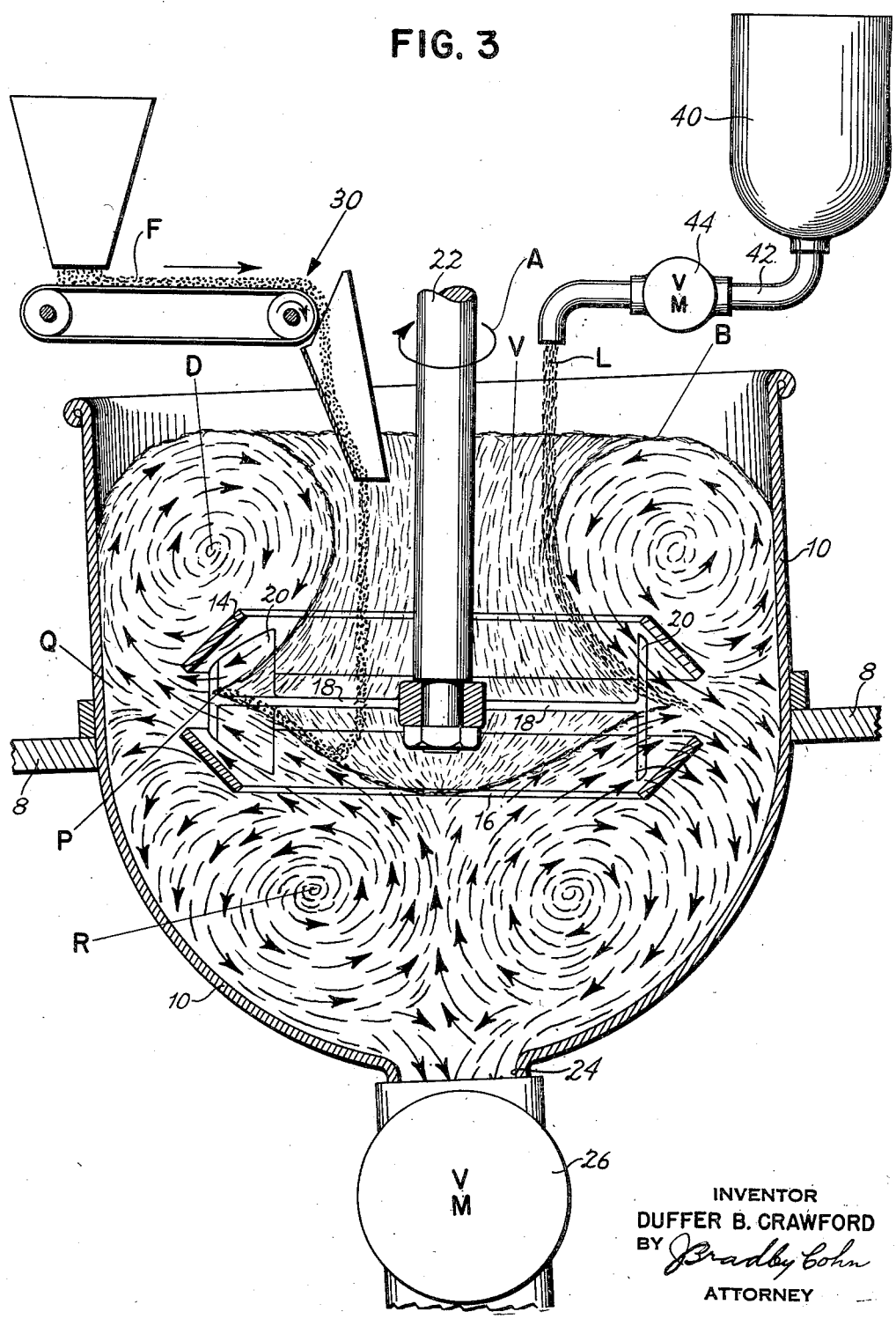

April 2, 1957 D. B. CRAWFORD 2,787,447
CONTINUOUS MIXER
Filed Aug. 24, 1953 3 Sheets-Sheet 3
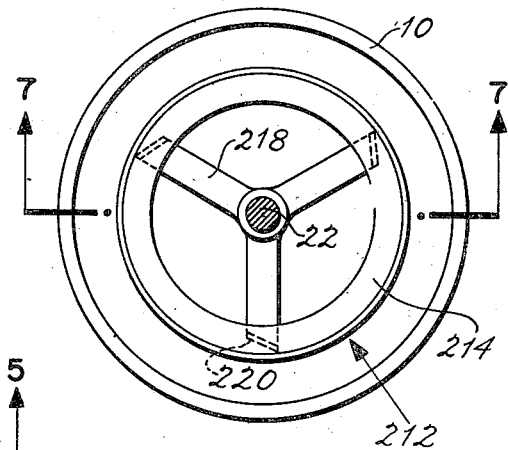
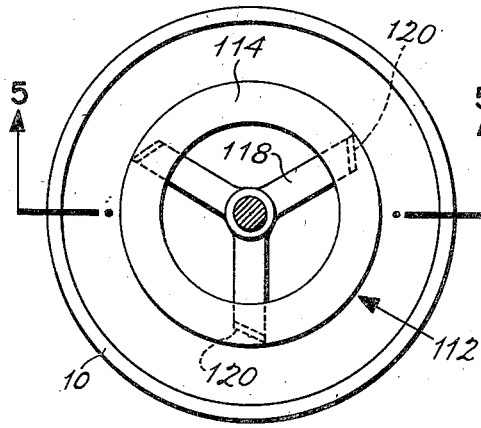
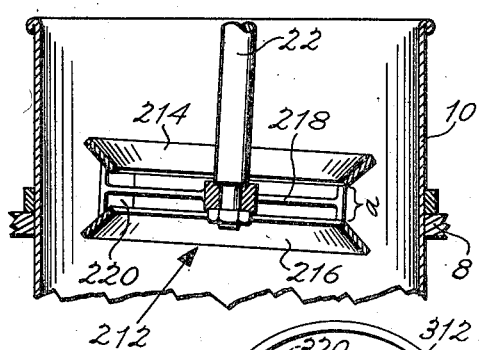
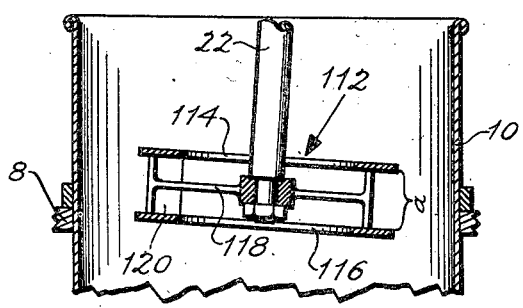
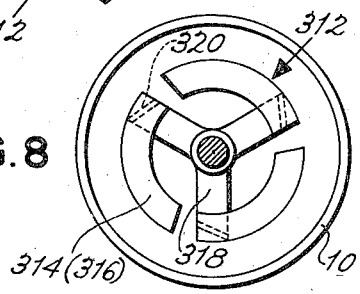
INVENTOR
DUFFER B. CRAWFORD
BY
ATTORNEY

United States Patent Office 2,787,447
Patented Apr. 2, 1957

2,787,447
CONTINUOUS MIXER

Duffer B. Crawford, Westfield, N. J., assignor to American Machine & Foundry Company, a corporation of New Jersey Application August 24, 1953, Serial No. 376,162

28 Claims. (Cl. 259—8)

This invention is a continuation-in-part of my co-pending application for Letters Patent Serial No. 224,271, filed May 3, 1951, and now abandoned.

This invention relates generally to continuous mixing and more specifically to a continuous pre-mixing process for blending the wet and dry ingredients used in cakes, muffins and the like. It may also be used for blending other wet and dry substances, such as used in plaster, cement, paint and chemicals. By dry ingredients I mean semi-solids as well as solids and powders, for example shortening and jells.

Although recent developments in the art have made it possible to meter the feed of dry materials, it is not possible to feed dry materials through ordinary pipe lines into a pressure vessel. It must first be rendered pumpable by forming a mixture or slurry. Heretofore, where it has been required or desirable to feed ingredients into a continuous pressure mixer this slurry has been formed or pre-mixed by some batch method. For continuous operation, such pre-mixing requires at least two batch mixers used alternately to insure a steady supply to the continuous mixer. Additional equipment is required for this and, usually, additional operators. Also, the last fed portions of batches seldom have the same composition and/or characteristics as the first part of the batch.

It is therefore an object of this invention to provide a means and a method of continuously, quickly (i. e. high intensity) and in small volume, pre-mixing wet and dry ingredients. With a satisfactory continuous pre-mixer, the additional equipment and operators of the batch method are eliminated. The continuous system has a very high capacity, but because it operates on smaller volume than batch systems, lower horsepower installations are permissible.

The principal difficulty in developing continuous premixers has been that the dry ingredients are not wetted and therefore tend to form a lumpy slurry or poor mix. I have found that an homogenous mix of wet and dry ingredients may be formed if a thin layer of the dry ingredients are "sandwiched" between two high speed rapidly converging layers of wet ingredients. The dry ingredients are thereby thoroughly wetted and readily mixed without the formation of undesirable lumps.

It is therefore a further object of my invention to provide a mixer that creates two such converging sheets of wet ingredients at a position to receive and wet a thin steam of dry ingredients fed by suitable metering means.

It is an object of my invention to utilize the double impeller hereinafter described to create two rotating and revolving collars of fluid. These dynamic collars are created when a certain critical level (Fig. 3) is maintained. The necessary level is secured, of course, by regulating the feed of ingredients with the rate of withdrawal of mix from the bowl.

It is a prime object of my invention to continuously produce a blended homogeneous mix suitable for pumping to a continuous mixer, particularly a pressurized continuous mixer.

In the accompanying drawings:

Fig. 3 is a sectional side elevation of my apparatus illustrating the dynamic flow;

Fig. 4 is a plan view of a mixing bowl in conjunction with a modified impeller;

Fig. 5 is a sectional side elevation of the same taken on line 5—5 of Fig. 4;

Fig. 6 is a plan view of a mixing bowl in conjunction with another modified impeller;

Fig. 7 is a sectional side elevation of the same taken on line 7—7 of Fig. 6; and Fig. 8 is a plan view of a modified impeller with sectional annular members.

Because of the difficulty of describing the kinematics illustrated in Fig. 3, I will use the word "revolve" to describe the circumferential motion about the axis of the impeller in the direction of the arrow A, and the word "rotate" to describe the rotary radial motion to and from the axis of the impeller illustrated by the direction of movement arrows within the mixing bowl 10.

Figure 1:
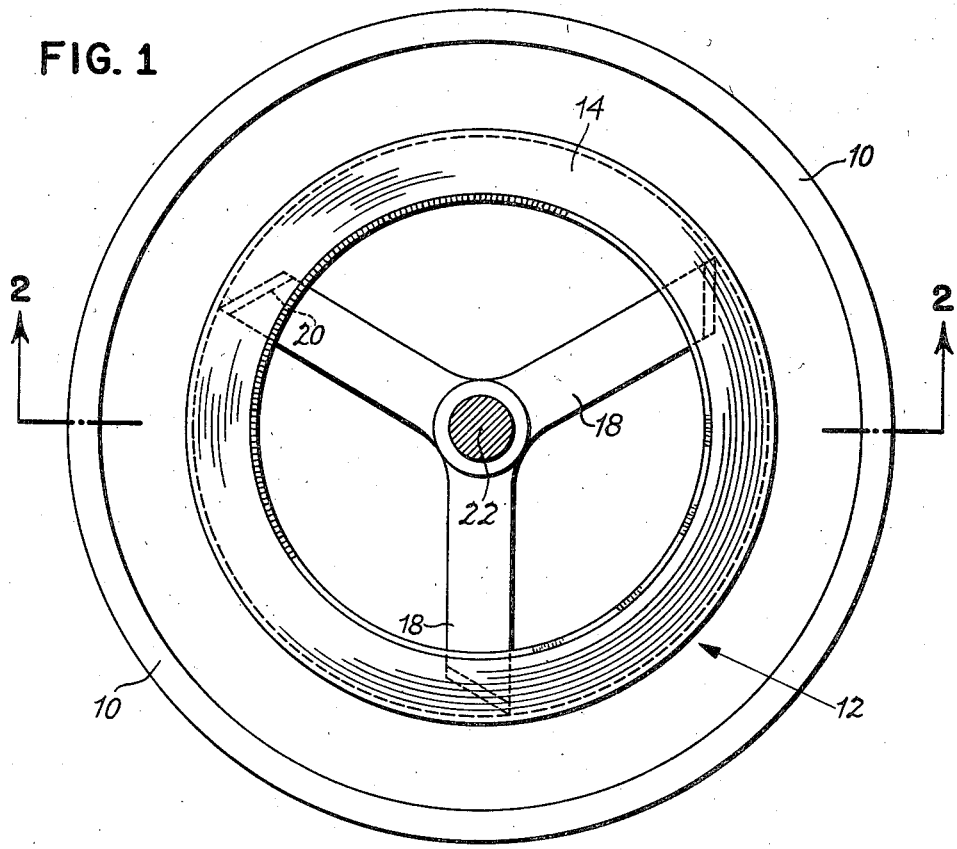
Fig. 1 is a plan view of my mixing bowl and impeller.
Figure 2:
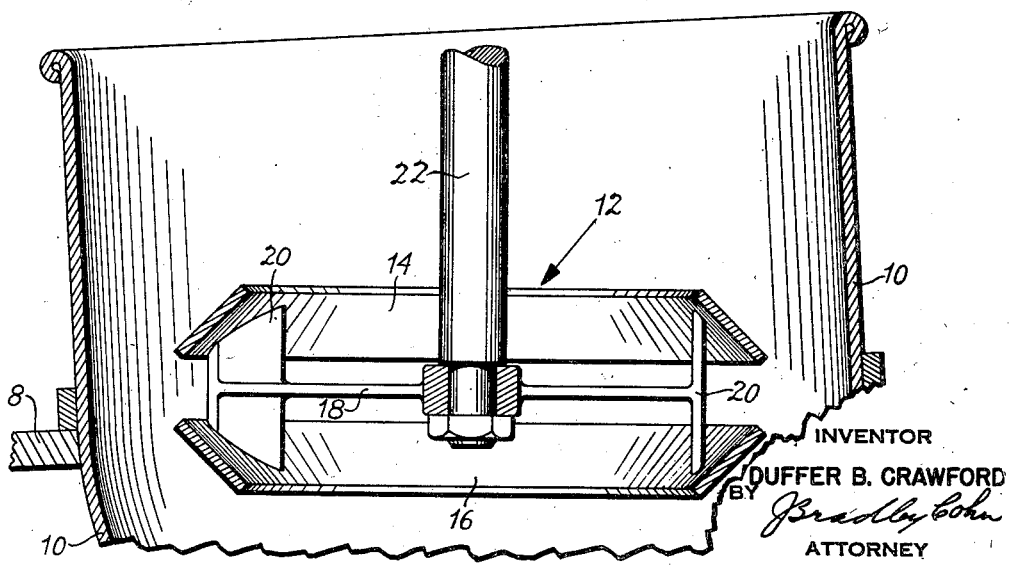
Fig. 2 is a sectional side elevation of the same taken on line 2—2 of Fig. 1.

The bowl 10 supported on a seat 8 is equipped with a driven impeller 12. This impeller consists of two truncated cone-like members 14 and 16 mounted in axial spaced relation on shaft 22. Cone 14 is inverted and positioned below and spaced from cone 16 in base to base relation. Referring to Fig. 1 and 2, the cones are supported by spokes 18 and struts 20 to a shaft 22 driven by means not shown. The struts 20 may be formed, if desired, as vanes positioned as shown in Fig. 1 with regard to the direction of rotation of the impeller.

I have found it preferable to angularly incline impeller 12 or bowl 10 as illustrated in Figs. 2 and 3. This inclination tends to improve the intermix between top and bottom in the bowl. Referring to the arrows at the left of Fig. 3, material is hurled upward from the roll R to the donut D, while at the right material is drawn from the donut D to the roll R. This is particularly beneficial in obtaining uniformity in preparing highly viscous mixes.

The action of my impeller on a liquid is as follows: As illustrated in Fig. 3, the liquid is maintained at a certain predetermined level indicated by B. When the liquid is maintained at this proper height and the impeller rotated, a vortex V is created forming a dynamic donut shape roll D in the upper portion of the bowl and a counter-rotating bottom roll R in the lower portion. The bottom roll R has little or no vortex. Thus, dry ingredients F spilling down the vortex V are floated to point P. In like manner, dry ingredients that may fall on the donut roll D are carried on the surface of roll D down to point P. The vortex V also serves as a vent to prevent cavitation.

When dry ingredients are first incorporated into a liquid, air is entrapped. On impellers having a low pressure area such as a marine impeller, the air collects at the low pressure area of the impeller and destroys or materially reduces its efficiency. In the impellers of this invention, no such low pressure areas exist. Hence there is no cavitation and no gathering of air about the impeller. Since the operation of the impeller therefore remains constant, the vortex V remains constant. Thus the dry ingredients may be fed down the vortex V continuously to the converging surface at P and the adherent air vent back out vortex V.

From the point P the dry ingredients F pass as a thin layer between the converging surfaces, being thrown radially by centrifugal force, of the donut roll D and the bottom roll R toward the point Q. Contact with the two surfaces thoroughly wets the dry ingredients F whereupon they are incorporated into the mix.

It will be noted by reference to Fig. 3, that the rotating liquid continually bathes the annular members 14 and 16. The added dry ingredients cannot contact these members. I have found that when centrifugal impellers such as a single disc are employed, the dry ingredients build up momentarily and intermittently on the surface of the impeller. This reduces the efficiency and will destroy the vortex. The drop in efficiency is due, I believe, to the lubricating action of the dry material on the surface of the impeller.

The predetermined liquid level referred to varies with mixes of different viscosities but for any given rheological properties a certain liquid level may be determined that creates the dynamic fluid conformation herein described.

If the liquid level be too high relative to the impeller the vortex V will be substantially closed. Then, the dry ingredients do not mix readily but tend to float on the top of the mix.

If the liquid level is too low relative to the impeller the top donut D will not bathe the impeller properly. There will then be absent the converging wetting surfaces and the dry ingredients will tend to build up on the impeller and fail to be incorporated into the mix.

When, however, the liquid level is at a proper height, and the kinetic conformation illustrated in Fig. 3 produced, the liquid ingredients L may be fed at a constant rate from the container 40 through the pipe 42 and the control valve 44 into the bowl 10. The dry ingredients F are fed by a suitable dry metering device generally indicated at 30. They pass into the vortex V to be carried to the point P where the outer layers of the donut D and the roll R converge to wet the dry ingredients F, which are then readily mixed with the wet ingredients during rotation about the donut D or the roll R. At the bottom of the bowl 10 the mix is drawn off continuously through a discharge orifice 24 having a control valve 26 to maintain the liquid at the required level.

I prefer this method of controlling the liquid level. It adapts itself best to continuous mixing. However, it is quite apparent that it is not the absolute depth of liquid that controls, but rather the relative depth of the impeller below the surface. Thus a batch method would work if the shaft 22 and the impeller were slowly raised as the ingredients are added. Of course, the mixed material deep below the impeller would be subjected to little or no action, but would not hinder the kinematics in the active zone above. The shaft may be raised or lowered by conventional means, for example as shown in the patent to Edwards 2,541,221.

Another embodiment of my invention is shown in Figs. 4 and 5. Referring to Fig. 5, the impeller 112 is formed by the planar or annular rings 114 and 116 mounted on shaft 22 by means of spokes 118 and struts 120. When the double planar rings 114 and 116 are rotated in a liquid of given viscosity, a dynamic configuration identical to that shown in Fig. 3 may be obtained if the depth of the impeller is adjusted to a certain depth which while critical and specific for any given viscosity varies from one viscosity to the next.

I have also found that it is not necessary to mount frusto-conical impeller members in base to base relationship. Accordingly, I show in Figs. 6 and 7 the impeller 212 with the frusto-conical members 214 and 216 mounted in spaced relation vertex to vertex.

Comparing the embodiment shown in Fig. 7 with that in Fig. 2, it is quite apparent that there is no fundamental difference in the attitude of the cone and this is true even where there is no conical structure or the angle of inclination is zero as noted in Figs. 4 and 5.

My invention thus relates to a process for forming two converging surfaces of liquid to sandwich dry ingredients therebetween to wet them and thereafter mix them readily. It further relates to an apparatus wherein an impeller having a centrifugal pumping action sets up a dynamic conformation of fluid ingredients wherein two surfaces of liquid converge and the point of convergence is vented to the atmosphere.

In all prior mixers known to me this has never been attained. It is accordingly a part of my invention to devise an apparatus wherein physical forces may be exerted on a liquid to produce the above described vented converging surfaces. In addition, it is likewise important to provide mixing action subsequent to the convergence.

With reference to Fig. 3, this mixing action is obtained in part by the impact of the liquid against the walls of the container at Q. Furthermore, the rotating and revolving motion thereinafter produced on the mix further blends and mixes the several ingredients, as does the intermix between top and bottom rolls R and D.

Referring now to Fig. 3, it should be pointed out that the dynamic conformation produced on the mix illustrated by the flow arrows may be obtained with any of the several types of impellers shown in this application or substantially similar structure. It should be further noted that these impellers have in common certain important structures, viz., each has an open throat and each has a space "a" located between the circular members. This structure plus the mechanism for controlling the depth constitutes the essential features of the impeller. Further the impeller should work best in a vessel not more than two diameters larger than the impeller, especially with the more viscous mixes.

It is important that there be reasonable proportions in the construction of my impeller in order to practice the invention. The impeller should be sufficiently large with relation to the containing vessel. While preferably I employed a vessel with a hemispherical bottom as shown in Fig. 3 of my preferred embodiment, I deliberately do not show the bottom in Figs. 5 and 7 for the reason that the invention will work regardless of the shape of the bottom. For example, a flat bottom will function although there will be inactive zones in the corners distant from the impeller and the rotary motion induced on the liquid by the impeller. Furthermore, the distance which the members 14, 114 and 214 are spaced from the members 16, 116 and 216 should have some relation to the diameter of the throat or opening in the members. Thus the distance "a" (Figs. 5 and 7) is preferably in the range of one-twentieth to two-thirds the diameter of the throat. The throat itself is preferably large, and should not be smaller in diameter than one-third the diameter of the impeller.

In order to practice my invention, it is important that an impeller may be employed which when submerged to the proper determinable depth will exert on the liquid centrifugal forces capable of producing donut rolls D and R while the impeller remains at all times masked or bathed within liquid of the donut rolls. Other impellers, such as simple discs, can produce the donut roll conformation. Also, a marine screw impeller can produce a vortex. However, such impellers are not masked in the liquid, or if masked, produce cavitation.

For example, when a simple disc is employed, the disc remains exposed. Dry ingredients fed between the roll D and the disc, lubricate the disc intermittently and destroy its effectiveness for continuous mixing. With a marine type impeller cavitation is produced behind the hydrofoil. Air incorporated in the ingredients soon collects in the low pressure area to again destroy the efficacy of the impeller. Also the marine impeller does not have the converging surfaces. When a double impeller having no foil and therefore no tendency to provide cavitation is employed, the liquid bathes each member of the impeller and so prevents the dry material from adhering. Thus its efficiency is not destroyed or adversely affected either by this or the collection of air. Further, the adjustment of the depth of the impeller in the liquid creates the open throat to vent the point P at the convergence of the liquid surfaces.

I would like to point out that I employ struts 20, 120 and 220 of rectangular cross section to provide strength. When such struts are used, it is preferable but not at all necessary to position them angularly as shown with regard to the direction of rotation. The spokes 18, 118 and 218 and struts 20, 120 and 220 are, of course, only for support and any other mode of mounting the impeller members would be within the spirit of the invention.

It should be further pointed out that a preferred embodiment uses a completely annular disc or cone as shown in the various embodiments hereinabove. However, there will be no departure from the spirit of the invention to use segments of said disc or cone as indicated in Fig. 8 by impeller segments 314 (316). Further, variations in speed between the upper and lower members is permissible.

I attribute the rapid and smooth admixture of the wet and dry ingredients to the action of the double annular impeller in a specific height of liquid. As already described, this impeller imparts centrifugal force to the mix to cast it outwardly between the two annular members. Dry ingredients therefore never contact these members and therefore do not adhere to or build up thereon. In addition to this centrifugal action that causes the wetting of the dry ingredients, the impeller 12, 112 and 212 revolves the mix circumferentially around the bowl for uniform blend.

I claim:

1. A method of mixing wet and dry ingredients comprising revolving blended mixed ingredients in one direction to form a natural vortex extending partway through the blended ingredients and at the bottom of the vortex driving the blended ingredients radially therefrom to form two rapidly moving surfaces of the blended ingredients converging at an acute angle and continuously adding dry ingredients to the point of convergence of said surfaces and thereby entrapping the dry ingredients between said rapidly moving converging surfaces.

2. A method of mixing wet and dry ingredients in a containing vessel comprising revolving a liquid formed of the wet and dry ingredients in one direction to raise the periphery and lower the center surface of said liquid to a natural vortex extending downwardly partway through the blended ingredients radially therefrom toward the wall of said container to form two converging outwardly moving surfaces of the blended ingredients, said surfaces being formed from the vertical surface of the vortex and the bottom of the vortex, and adding dry ingredients to the blended ingredients so that the dry ingredients are entrapped between said converging surfaces and moved rapidly therewith toward the wall of said container.

3. A continuous method of mixing wet and dry ingredients comprising revolving blended mixed ingredients in one direction to form a vortex extending substantially halfway through the depth of the blended ingredients and at the bottom of the vortex driving the blended ingredients radially of the vortex to form two converging surfaces of the blended ingredients with a cavity between said surfaces in communication with the atmosphere, simultaneously adding dry and wet ingredients to the blended ingredients so that the dry ingredients are fed into said cavity and entrapped between said converging surfaces and air introduced with said dry ingredients is exhausted through said vortex, and continuously removing blended ingredients from said rotating fluids and adding liquid and dry ingredients thereto at an equivalent rate to maintain a constant liquid level of the blended ingredients.

4. A continuous method of mixing wet and dry ingredients comprising revolving blended mixed ingredients in one direction to form a natural vortex extending substantially halfway through the blended ingredients and driving the blended ingredients at the bottom of the vortex radially thereto to form two converging surfaces of the blended ingredients and simultaneously adding dry and wet ingredients to the blended ingredients so that the dry ingredients are entrapped between said converging surfaces and adding to said revolving mass of blended ingredients unmixed wet and dry ingredients and drawing from said rotating mass of blended ingredients mixed liquid and dry ingredients.

5. The process for continuously mixing wet and dry ingredients of a batter comprising feeding wet and dry ingredients, revolving a predetermined amount of mixed wet and dry ingredients to form an open vortex, driving said mixed ingredients outwardly from the bottom of the vortex to form two oppositely rotating rolls of liquid tangentially contacting each other and open to the atmosphere through said vortex, and adding the dry ingredients to the point of tangential contact whereby they are quickly wetted by said mixed ingredients and admixed therein.

6. The process for continuously mixing wet and dry ingredients of a batter comprising feeding wet and dry ingredients, revolving a predetermined amount of mixed wet and dry ingredients to form a vortex, driving said mixed ingredients outwardly from the bottom of the vortex to form two oppositely rotating rolls of liquid tangentially contacting each other, feeding further wet and dry ingredients to said mixed ingredients, and removing mixed ingredients from said revolving ingredients at a rate commensurate with the feed of said wet and dry ingredients to maintain the predetermined constant amount of mixed ingredients.

7. The process of mixing wet and dry ingredients comprising, whirling a blended mix of wet and dry ingredients to form two dynamic counter-rotating rings in tangential contact and feeding additional dry ingredients to said rotating rings by passing said dry ingredients to the point of tangential contact of said rotating rings to carry said dry ingredients therebetween so that said dry ingredients are wetted as they pass between said rings and then mixing said wetted dry ingredients with said mixed ingredients.

8. The process of admixing dry ingredients with liquid ingredients wherein two converging surfaces of liquid ingredients are formed and dry ingredients fed therebetween, which comprises driving two streams of liquid at substantial velocity along paths converging at an acute angle until they meet to form a single composite stream, continuously feeding dry ingredients into the angle between said liquid streams to secure rapid wetting of said dry ingredients at the convergence of said streams of liquid, and thereafter subjecting said wetted ingredients to vigorous mixing action in said composite stream to complete the incorporation of the dry ingredients.

9. A continuous mixer for mixing wet and dry ingredients, a container having means to maintain a predetermined level of mixed dry and wet ingredients therein, a mixing impeller comprising an open ended inverted frusto-conical hollow member, and a second open ended frusto-conical hollow member mounted base toward base in axial spaced relation, drive means operative to rotate said impeller in said container, feed means to supply a continuous flow of wet ingredients into the container and other feed means to supply a continuous feed of dry ingredients into the top of said container, and a discharge device to withdraw mixed ingredients at the rate said feed means supply the wet and dry ingredients to maintain a critical level as said impeller revolves said mixed ingredients to create a natural vortex extending through and substantially to the base of the inverted conical member and hurl said mixed ingredients outwardly between the bases of said members in said impeller to create rotating dynamic rings about a vortical cavity in communication with the said mixed ingredients.

10. A continuous mixer for mixing wet and dry ingredients, a container having means to maintain a predetermined level of mixed dry and wet ingredients therein, a mixing impeller comprising an inverted frusto-conical member and a second frusto-conical member mounted base toward base in axial spaced relation, said conical members being formed with a central opening having a diameter larger than the width of said frusto-conical member, drive means operative to rotate said impeller in said container, feed means to supply a continuous flow of wet and dry ingredients into the top of said container, and a discharge device to withdraw mixed ingredients from said container at a rate to create a natural vortex extending through and substantially to the base of the inverted member and hurl said mixed ingredients outwardly between the base of said members in said impeller to create rotating dynamic rings about a vortical cavity in communication with the atmosphere to mix said ingredients fed from said feed means with said mixed ingredients.

11. A mixing device suitable for mixing dry and wet ingredients comprising a container for holding the wet ingredients, a mixing impeller positioned in said container, said impeller comprising a substantially vertical shaft, a pair of annular members mounted about said shaft, spaced from each other axially along said shaft, and having a relatively large central annular opening through said members, the diameter of said opening being larger than the largest radius of said members, the diameter of said members being greater than half the distance across said container, means for rotating said impeller, feed means to feed to said container dry ingredients to be blended with said wet ingredients, and further means to adjust the depth the annular members of said impeller are immersed in said wet ingredients a distance sufficient to create during rotation of said impeller two oppositely rotating dynamic rings of liquid vehicle having an open vortex.

12. In a continuous mixer for mixing liquid and dry ingredients, an open bowl having a cylindrical upper portion and a hemispherical bottom portion, an impeller mounted for rotation in said bowl, said impeller comprising a substantially vertical shaft and a pair of truncated cones having an external diameter at least half the diameter of the bowl co-axially mounted base to base in axial spaced relationship on said shaft, means to maintain a predetermined height of blended liquid and dry ingredients in said bowl to maintain during rotation of said impeller sufficient liquid to wet the underside of the upper cone and insufficient to close the open throat of the vortex along the impeller shaft, said means comprising a dry metering device to feed dry ingredients into said bowl at a predetermined rate, and a liquid metering device to feed liquid ingredients into said bowl at a predetermined rate, and a discharge device to remove blended liquid and dry ingredients from said bowl at a rate equivalent to the cumulative feed rate of said dry and liquid ingredients.

13. An apparatus for mixing dry ingredients in a liquid vehicle comprising a mixing bowl having an inner liquid contacting surface, liquid feed means to feed a liquid vehicle into said bowl, dry feed means to feed dry ingredients into said bowl, a mixing element comprising a substantially vertical drive shaft projecting into said bowl, said drive shaft having mounted thereon in base to base relationship axially spaced from each other a pair of truncated cones, the outer periphery of said cones being spaced from said liquid contacting surface a distance less than half the largest radius of said cones, and a discharge valve operative to control the discharge of blended ingredients from said bowl and maintaining a constant predetermined level therein so said impeller will revolve said liquid vehicle in said bowl and simultaneously create two oppositely rotating dynamic rings of liquid vehicle.

14. An apparatus for mixing dry ingredients in a liquid vehicle comprising a mixing bowl, liquid feed means to feed a liquid vehicle into said bowl, dry feed means to feed dry ingredients into said bowl, a mixing element comprising a drive shaft projecting into said bowl at an angle slightly inclined from the perpendicular, said drive shaft having mounted thereon in base to base relationship axially spaced from each other a pair of open ended truncated cones, and a discharge valve operative to control the discharge of blended ingredients from said bowl so as to maintain a constant predetermined level therein so that the rotation of said impeller will revolve said liquid vehicle in said bowl to simultaneously create two oppositely rotating dynamic rings of liquid vehicle.

15. In a continuous mixing device, an open container, a dasher operatively mounted for rotation in said container, said dasher having at least one upper and one lower truncated cone co-axially positioned apart from each other in base to base relation, feed means to supply ingredients including fluid ingredients to be mixed to said chamber, a discharge orifice to remove the mixed ingredients from said container, control mechanism to regulate the feed of ingredients in proportion to the removal of ingredients to maintain a constant predetermined level in said container to provide a vortex extending downwardly to a point substantially midway between the cones on said dasher, said control mechanism with said dasher being operative to create said vortex and to mask said dasher in said fluid ingredients so dry ingredients fed to said mixed ingredients may pass through the upper of said cones and then outwardly between the bases of said cones and into the mix free from engagement with said dasher.

16. In a continuous mixing device, an open container, a dasher operatively mounted for rotation in said container, said dasher having at least one upper and one lower truncated cone co-axially positioned apart from each other in base to base relation, feed means to supply ingredients including fluid ingredients to be mixed to said chamber, a discharge orifice to remove the mixed ingredients from said container, control mechanism to regulate the feed of ingredients in proportion to the removal of ingredients to maintain a constant predetermined level in said container to form a symmetrical frusto-conical moving surface of material across the inner face of the upper of said cones whereby dry ingredients fed to said mixed ingredients pass through the upper of said cones and then outwardly between the bases of said cones and into the mix free from engagement with said dasher.

17. In a continuous mixer, an open bowl having a cylindrical upper portion and a hemispherical bottom portion, an impeller mounted for rotation in said bowl, said impeller comprising a substantially vertical shaft and a pair of open ended truncated cones having an external diameter of at least half the diameter of the bowl and co-axially mounted base to base in axial spaced relationship on said shaft, means to control the fluid level of said bowl to submerge said cones a predetermined distance into the fluid to form upon rotation a vortex extending substantially to the bottom only of the lower of said cones.

18. In a continuous mixer, an open bowl having a cylindrical upper portion and a hemispherical bottom portion, an impeller mounted for rotation in said bowl, said impeller comprising a substantially vertical shaft and a pair of truncated cones having an external diameter of at least half the diameter of the bowl and co-axially mounted base to base in axial spaced relationship on said shaft, and means to control the depth of said cones in said bowl and said mix a predetermined distance to form upon rotation of said impeller a vortex in said mix extending substantially to the bottom only of the lower of said cones.

19. An apparatus for mixing dry ingredients in a liquid vehicle comprising a mixing bowl, a mixing element mounted for rotation in said bowl, said mixing element having a centrally positioned drive shaft, two spaced annular members mounted about and coaxial to said drive shaft, each of said members having a large central opening, said opening having a diameter greater than one-quarter the diameter of said circular members, feed means to supply liquid and dry ingredients to said bowl, and means to selectively position the height of said circular members in said bowl whereby said liquid ingredients may be revolved about said bowl and coaxial to said driven shaft and may be driven radially at a point substantially midway between said members.

20. An apparatus comprising a bowl, a rotary centrifugal pump in said bowl and adjustable vertically in predetermined selective positions, said pump comprising a pair of spaced members operatively secured to and about a driven rotatively mounted shaft, said spaced members having a central opening of a diameter greater than half the diameter of said members, said members further having a diameter greater than half the diameter of said bowl and means to position said pump in said selective positions relative to the height of the fluid ingredients in said bowl to form a vortex in said ingredients extending substantially to a point midway between said spaced members of said pump.

21. An apparatus for mixing dry and wet ingredients comprising a bowl, a rotary centrifugal pump in said bowl and adjustable vertically in predetermined selective positions to create in a liquid in said bowl a vortex to receive dry ingredients into said bowl and said vortex, said pump comprising a pair of spaced planar members operatively secured to and about a driven rotatively mounted shaft, said spaced members having a central opening of a diameter greater than half the diameter of said members, said members further having a diameter greater than half the diameter of said bowl.

22. An apparatus for incorporating ingredients into liquid ingredients comprising a containing vessel for said liquid ingredients, an impeller mounted for rotation in said vessel, said impeller having a substantially vertical rotatable shaft, a pair of spaced annular members mounted on said shaft for rotation therewith, said members having a large central opening, and means to control the relative depth of said impeller in a liquid contained in said vessel said means being operative to control the depth of the vortex formed upon rotation of said impeller in said liquid ingredients to a point substantially midway between said spaced members.

23. An apparatus for incorporating ingredients into liquid ingredients comprising a containing vessel for said liquid ingredients, an impeller mounted for rotation in said vessel, said impeller having a substantially vertical rotatable shaft, a pair of spaced frusto-conical members mounted vertex to vertex in spaced relation, said members having a large central opening, and means to control the relative depth of said impeller in a liquid contained in said vessel said means being operative to control the depth of the vortex formed upon rotation of said impeller in said liquid ingredients to a point substantially midway between said spaced members.

24. An apparatus for blending wet and dry ingredients comprising a bowl; an impeller mounted for rotation in said bowl, said impeller having a substantially vertical rotatably driven shaft, a pair of spaced annular members mounted on said shaft to rotate with said shaft in a plane substantially transverse the axis of rotation, the greatest dimension of said members being more than half the distance across said bowl, and said members having formed therein a central opening extending outward from said shaft more than one-third the distance said members extend outwardly from said shaft; metering feed means to feed wet and dry ingredients into the top of said bowl, and a discharge device to withdraw mixed ingredients from said bowl at a controlled rate to maintain a predetermined amount of material in said bowl.

25. An apparatus for blending ingredients comprising a containing vessel; an impeller mounted for rotation in said vessel, said impeller having a substantially vertical rotatable shaft, a pair of spaced annular members mounted on said shaft in a plane transverse to the axis of rotation, said annular members having a large central opening, said annular members being spaced apart a distance not greater than two-thirds the diameter of the central opening in said members, and means to control the depth to which said annular members are submerged in a liquid contained in said vessel said means being operative to control the depth of the vortex formed upon rotation of said impeller in said liquid to a point substantially midway between said spaced members.

26. An apparatus for blending ingredients comprising a containing vessel; an impeller mounted for rotation in said vessel, said impeller having a substantially vertical rotatable shaft, a pair of spaced annular members mounted on said shaft in a plane transverse to the axis of rotation, said annular members having a large central opening and having an outside diameter greater than half the diameter of said containing vessel; and means to control the depth to which said annular members are submerged in a liquid contained in said vessel said means being operative to control the depth of the vortex formed upon rotation of said impeller in said liquid to a point substantially midway between said spaced members.

27. The process of mixing wet and dry ingredients comprising, whirling a blended mix of wet and dry ingredients to form two dynamic counter-rotating rings in tangential contact and feeding additional dry ingredients to said rotating rings by depositing said dry ingredients on the surface of the rings so that the dry ingredients will be carried to the point of tangential contact to carry said dry ingredients between said rotating rings so that said dry ingredients are wetted as they pass between said rings, and mixing said wetted dry ingredients with said mixed ingredients.

28. An apparatus for blending wet and dry ingredients comprising a bowl; an impeller mounted for rotation in said bowl, said impeller having a substantially vertical rotatably driven shaft, a pair of spaced annular members mounted on said shaft to rotate with said shaft in a plane substantially transverse the axis of rotation, said members having formed therein a central opening extending outward from said shaft, said members being spaced from each other a distance no greater than two-thirds the diameter of said opening, a metering means to feed wet and dry ingredients into the top of said bowl, and a discharge device to withdraw mixed ingredients from said bowl at a controlled rate to maintain the predetermined amount of material in said bowl.

References Cited in the file of this patent

UNITED STATES PATENTS

| | | |
|---|---|---|
| 1,076,666 | Dorr | Oct. 28, 1913 |
| 1,406,791 | Werner | Feb. 14, 1922 |
| 1,765,386 | Wait | June 24, 1930 |
| 1,768,957 | Johnson | July 1, 1930 |
| 1,908,002 | Valentine | May 9, 1933 |
| 2,074,673 | Sackett | Mar. 23, 1937 |
| 2,254,127 | Underwood | Aug. 26, 1941 |
| 2,377,937 | Hervert | June 12, 1945 |
| 2,541,221 | Edwards | Feb. 13, 1951 |